(12) United States Patent
Blair

(10) Patent No.: US 8,571,751 B1
(45) Date of Patent: Oct. 29, 2013

(54) METHOD AND APPARATUS FOR DATA ACQUISITION, DATA MANAGEMENT, AND REPORT GENERATION FOR TRACTOR TRAILER SUBSYSTEM TESTING AND MAINTENANCE

(71) Applicant: Lite-Check LLC, Spokane, WA (US)

(72) Inventor: Robert Marion Blair, Spokane, WA (US)

(73) Assignee: LITE-CHECK Fleet Solutions, Inc., Spokane, WA (US)

( * ) Notice: Subject to any disclaimer, the term of this patent is extended or adjusted under 35 U.S.C. 154(b) by 0 days.

(21) Appl. No.: 13/666,793

(22) Filed: Nov. 1, 2012

(51) Int. Cl.
 *G01M 17/00* (2006.01)
 *G06F 7/00* (2006.01)
 *G01R 31/02* (2006.01)

(52) U.S. Cl.
 USPC .......... 701/32.8; 701/33.2; 324/504; 340/431

(58) Field of Classification Search
 None
 See application file for complete search history.

(56) References Cited

U.S. PATENT DOCUMENTS

| 5,488,352 | A  | * | 1/1996  | Jasper  | 340/431 |
|-----------|----|---|---------|---------|---------|
| 6,265,878 | B1 | * | 7/2001  | Traub   | 324/504 |
| 2009/0009304 | A1 | * | 1/2009  | Lacasse | 340/431 |
| 2010/0256865 | A1 | * | 10/2010 | Ying    | 701/33  |

* cited by examiner

*Primary Examiner* — James Trammell
*Assistant Examiner* — Demetra Smith-Stewart
(74) *Attorney, Agent, or Firm* — Lee & Hayes, PLLC

(57) ABSTRACT

Techniques for operating, testing, and generating a testing report for the electrical and air subsystems of a vehicular trailer, without the use of an associated truck tractor are disclosed. The system includes a portable testing unit with self-powered electrical and air subsystems which are interconnected to the corresponding subsystems of the vehicular trailer under test. The portable testing unit can be rolled about on a stand and functions as a mini-truck tractor, in the sense that it selectively provides electrical power and air to the VUT. The testing unit is controlled by a small, portable hand held radio frequency remote control that communicates test and data signals to a radio receiver in the portable testing unit. The system acquires testing data from both automatic and manual means from disparate sources. The system stores the testing data and automatically generates testing reports. The system manages the testing data and generated reports.

20 Claims, 5 Drawing Sheets

| MANUFACTURER | Your Company |
| SITE | Your City |
| VIN NUMBER | Your Trailer VIN |
| CUSTOMER | Your Customer |
| OPERATOR | Your Employee |
| ORDER NUMBER | Your Sales Order/Invoice |
| USER | 1 |
| TESTER SN# | 100053     3.10 HUB 2.00 |
| TESTER REV | 3.10 HUB 2.00 |

| ELECTRICAL | CONDITION | VOLTS | AMPS | TEST MODE | STATUS |
|---|---|---|---|---|---|
| BRAKE | GOOD | 13.70 | 0.65 | AUTO | PASS |
| MARKER | GOOD | 13.69 | 0.61 | AUTO | PASS |
| AUXIL | GOOD | 13.67 | 0.36 | AUTO | PASS |
| LEFT | GOOD | 13.73 | 0.28 | AUTO | PASS |
| TAIL | GOOD | 13.67 | 0.28 | AUTO | PASS |
| RIGHT | GOOD | 13.71 | 0.29 | AUTO | PASS |

| AIR SYSTEM | START PSI | END PSI | LOSS | TEST MODE | STATUS |
|---|---|---|---|---|---|
| EMERGENCY | 115 | 115 | 0 | LEAK TEST AUTO | PASS |
| SERVICE | 105 | 105 | 0 | LEAK TEST AUTO | PASS |

| 121-TIMING | S5.6.3 | S5.3.3 | S5.3.4 |
|---|---|---|---|
| | Application and Hold | Brake Actuation Time | Brake Release Time |

VEHICLE TYPE: Trailer Not Designed to Tow Another Trailer

| PORT SENSOR | LOCATION | EMER SET PSI | 121 SET SEC. | 121 REL SEC. |
|---|---|---|---|---|
| 1 AIRSENSOR | CURB 1 | | 0.513 PASS | 0.989 PASS |
| 2 AIRSENSOR | CURB 2 | | 0.510 PASS | 0.985 PASS |
| 3 AIRSENSOR | ROAD 1 | | 0.524 PASS | 0.975 PASS |
| 4 AIRSENSOR | ROAD 2 | | 0.511 PASS | 0.978 PASS |

DIFFERENTIAL PRESSURE TEST

LITE-CHECK GUI REV 3.11 Differential Pressure Report 2009 Sep30 13:40

Test Result: PASS

| Sample | Pass | DiffPSI | DOTReq | InPSI | OutPSI |
|---|---|---|---|---|---|
| 1 | | -0.3 | <=1.0 | 5.0 | 5.3 |
| 2 | | -0.5 | <=1.0 | 9.9 | 10.4 |

ABS

| Meritor WABCO ABS Fault Report | Fault# Description |
|---|---|
| Date: September 30, 2009 | 1. Ext. modulator RED open circuit detected |
| Time: 1:47 PM | 2. Sensor YE1 open circuit |
| Plant Location: Athens, TN | 3. Sensor YE2 open circuit |
| VIN: 102609 | 4. Sensor YE1 open circuit |
| Employee Info: Todd | |
| OEM: | |

ABS System Config: 2S/1M
ECU Revision: dabbPart Number: 446-500-1
Serial Number: 20036148Date of Manufacture: 12
Service Miles: 0.0
Tire Calibration: 502.0

FIG. 5

METHOD AND APPARATUS FOR DATA ACQUISITION, DATA MANAGEMENT, AND REPORT GENERATION FOR TRACTOR TRAILER SUBSYSTEM TESTING AND MAINTENANCE

BACKGROUND

A standard truck for long-haul transportation of freight generally includes a truck tractor and at least one vehicular trailer. A typical vehicular trailer includes separate electrical and air subsystems to control signals and breaking. Truck operators and vehicle regulators must routinely test and assess the operability of the electrical and air subsystems of these vehicular trailers. Routine testing of a vehicular trailer ensures that one can safely operate the trailer in compliance with regulation standards. Self-powered testing units, such as those described in TESTER FOR ELECTRIC AND PNEUMATIC SYSTEMS OF VEHICULAR TRAILERS (U.S. Pat. No. 4,586,370), which is hereby incorporated by reference in its entirety, can be directly connected to the electrical and air subsystems of a trailer to provide power and test the air and electrical subsystems without the use of an associated truck tractor. A mechanical or other tester using a testing unit will generate reports that contain test data resulting from the current test, along with historical and other data, such as fleet data. Typically, the mechanic must acquire this data from multiple sources and manually compile and prepare a final report. This manual process of compiling and analyzing test data can be time consuming and introduce human errors into the testing and reporting procedure.

BRIEF DESCRIPTION OF THE DRAWINGS

FIG. 5 is an exemplary final testing report.

DETAILED DESCRIPTION

Figure 1:
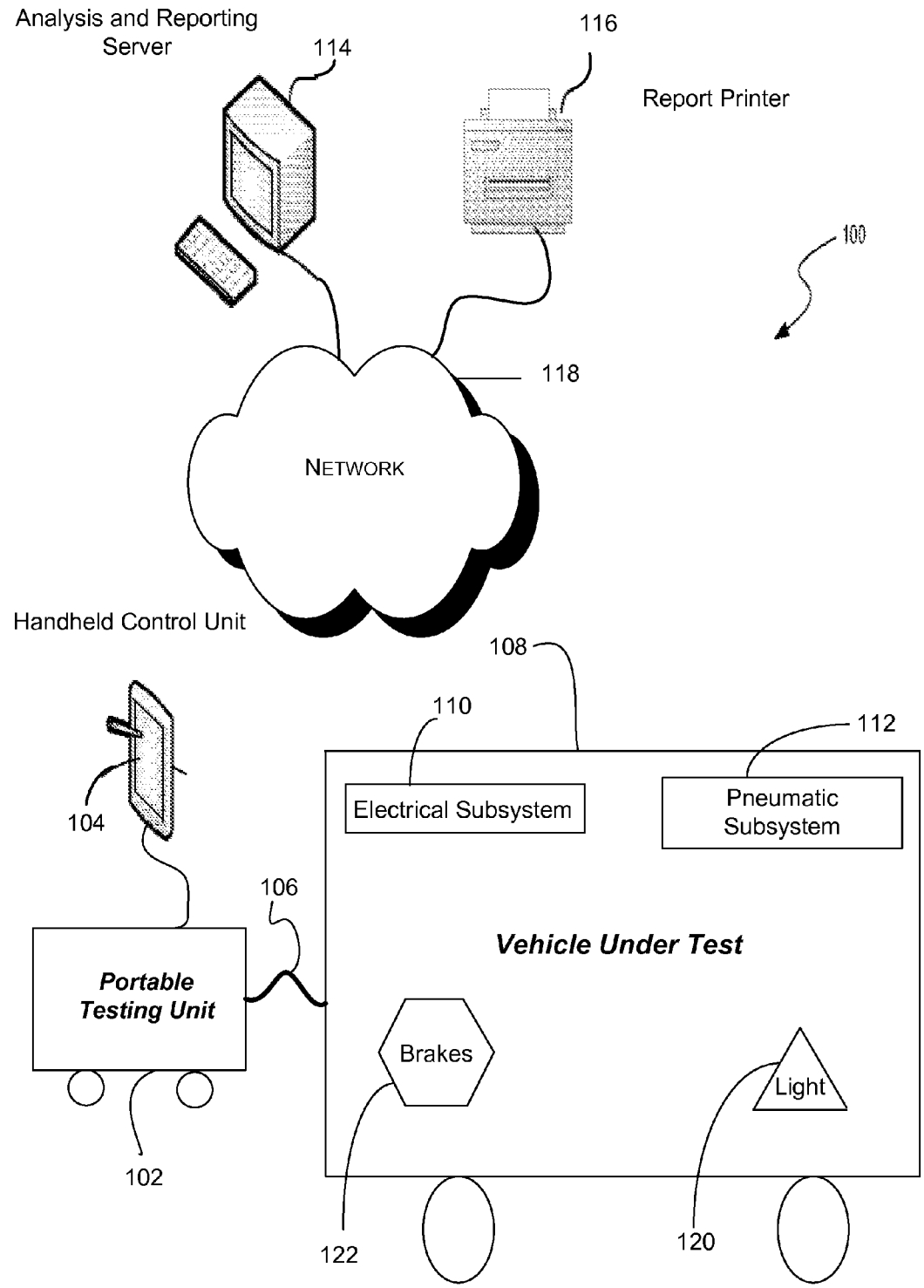
FIG. 1 is a system diagram of an environment in which embodiments of the invention may be implemented

A method and system for operating, testing, and generating a testing report for the electrical and air subsystems of a vehicle is disclosed (hereinafter the "testing and reporting system" or "the system"). The system allows for the operation and testing of vehicles including, but not limited to, tractors, trucks, buses, trailers, and other towed vehicles. The system provides electrical, pneumatic, and other power sources required for such operation and testing. In some embodiments, the system allows for the operation and testing of trailers and other towed vehicles without the use of an associated truck tractor. For illustrative purposes the specification details the operation and testing of tractor trailers. However, it will be appreciated that these general methods apply to the operation and testing of buses, power unit tractors, straight trucks, and other vehicles.

The system includes a portable testing unit with self-powered electrical and air subsystems which are interconnected to the corresponding subsystems of the vehicular trailer under test (hereinafter "VUT"). The portable testing unit can be rolled about on a stand and functions as a mini-truck tractor by selectively providing electrical power and air to the VUT. In some embodiments, the testing unit is controlled by a small, portable hand held radio frequency (RF) remote control that communicates test and data signals to a radio receiver in the portable testing unit.

In addition to providing electrical power and air to the VUT, the testing unit includes electronic diagnostic components that can measure and interpret the operational status of the electrical and air subsystems of the VUT. Furthermore, during the testing period, the portable testing unit monitors and electronically logs diagnostic data pertaining to its own operation and the operation of the VUT's electrical and air subsystems. In particular, the portable testing unit can acquire and analyze diagnostic data, including electronic data associated with the electrical and air subsystems of the trailer. Modern trailers often have well over a hundred sensors to monitor temperatures, pressures, voltages, currents, and the like. During a testing period, the testing unit can acquire readings, in the form of electronic data signals, from many of these sensors. Additionally, the testing unit may also be equipped with software to interpret the sensor data and perform preliminary diagnostics based on the sensor data. Other trailer-specific data can be acquired through the RF remote control or manually entered by a user. Furthermore, the testing unit can acquire and save data received from these disparate sources in a digitized format. The testing unit may communicate the digitized data to an analysis and reporting server device through a network. The analysis and reporting server device has access to other data for reporting, such as historical data pertaining to the particular VUT and larger datasets for an entire fleet of vehicular trailers, including the fleet that includes the VUT. The analysis and reporting server may access all the data needed to prepare a final report. The analysis and reporting server may compile all the relevant data, perform an analysis, and automatically generate a final testing report including a Department of Transportation report (hereinafter "DOT Report"). Additionally, the analysis and reporting server can automatically generate and send work orders, authorizations, part and maintenance invoices, and the like, as well as generate and save a vehicle history file.

FIG. 1 is a network diagram of a representative environment 100 in which the testing and reporting systems operates. However, not all of these components may be required to practice the invention. Variation in the arrangement and type of components may be made without departing from the spirit and scope of the invention.

As illustrated in FIG. 1, the environment 100 includes a portable testing unit (hereinafter "PTU") 102, which is connected to the vehicle under test 108. The PTU 102 provides electrical power and air to the VUT's 108 subsystems, including at least an electrical subsystem 110 and a pneumatic subsystem 112. In addition to providing power to subsystems 110 and 112, the PTU 102 can control and monitor some or all functionalities of the subsystems.

The electrical subsystem's 110 functionalities include the VUT's electrical lights. In particular, the trailer includes at least one brake light 120. In many embodiments, the electrical subsystem 110 includes functionalities such as Anti-Lock Brakes (hereinafter "ABS"), temperature control, and pressure systems. For many of the electrical functionalities of VUTs, a microcontroller and/or sensors are included in the VUT to control and monitor performance. The PTU 102 is enabled to operate and monitor some or all such microcontrollers, sensors, and any other component associated with the electronics of the VUT.

The pneumatic subsystem's 112 functionalities include delivering air to and operating the VUT's pneumatic brakes 122. As with the electrical system 110, the PTU 102 can operate and monitor all components associated with the VUT's pneumatics.

A physical connection between the PTU 102 and VUT 108 is enabled through the connecting assembly 106. The connecting assembly 106 includes a set of physical connectors and electrical, optical, and pneumatic pathways, such as wires, optical fibers, and hoses that allow the PTU 102 to deliver electrical and pneumatic power to the VUT subsystems 110 and 112. The connecting assembly 106 additionally includes physical connectors and electrical and optical pathways to allow the transmission of digital or analog electrical signals between the PTU 102 and VTU 108. The digital or analog signals may encode information relating to testing instructions or data pertaining to a test of the VUT 108. These signal and data pathways enable the PTU 102 to acquire test data and to control and operate the VUT subsystems 110 and 112.

The environment 100 additionally includes an RF handheld control unit (hereinafter the "HCU") 104 that is used to remotely control the operation of the PTU 102. The HCU includes controls to enable a user to initiate, run, and control a testing cycle on the VUT 108. In some embodiments, a user may manually input test data into the HCU 104. Alternatively, the HCU 104 may be used to automatically acquire test data using an optical scanner or camera. In some embodiments, some of the functionality of the HCU 104 may be redundantly implemented on the PTU 102, so that a user can initiate and control a test using either the HCU 104 or controls included on the PTU 102.

The HCU 104 typically communicates and sends control signals to the PTU 102 using RF electromagnetic waves or other wireless communications. In other embodiments, the HCU 104 may be tethered to the PTU through physical communication lines. In some embodiments, the HCU 104 may be implemented on a mobile computing device, such as a smart phone or a tablet.

The environment 100 additionally includes an Analysis and Reporting Server (hereinafter, the "server") 114. The server 114 communicates with the PTU 102 through a network 118. The network 118 may include one or more wireless networks, a wired network, a local area network (LAN), a wide area network (WAN), a direct connection such as a Universal Serial Bus (USB) port, and the like, and may include a public network, such as the Internet. In some embodiments, the HCU 104 may be communicate with the server and the PTU through the network 118.

The server 114 analyzes test data acquired by the PTU 102 during the testing of the VTU 108. In addition to the data acquired from the PTU 102 during testing, the test data may also include data supplied by the user or acquired through other means. The user supplied data may be entered automatically or manually with the HCU 104 or PTU 102. The test data may include additional data stored on the server 114, or data stored in a database which the server can access through the network 118.

The additional data may include historical test data or maintenance records associated with the particular VUT 108 or other tractor-trailers. The additional data may also include data associated with the fleet that the VUT 108 is a member of. The server 114 incorporates all of the relevant data and generates an analysis of the data using predefined analysis algorithms.

Upon performing the analysis, the server 114 may automatically generate a Final Report (hereinafter the "report"), which summarizes the test results for the VUT 108 in a format useful for the user. The contents and format of the report may be configured by the user. The report may be stored in a digital file, which may be stored on the server or sent to the printer 116 to generate a hardcopy. Additionally, the report may be supplied to the user through the HCU 104 or PTU 102. The report may also be made available to other devices, users, or system through the network 118.

Figure 2:
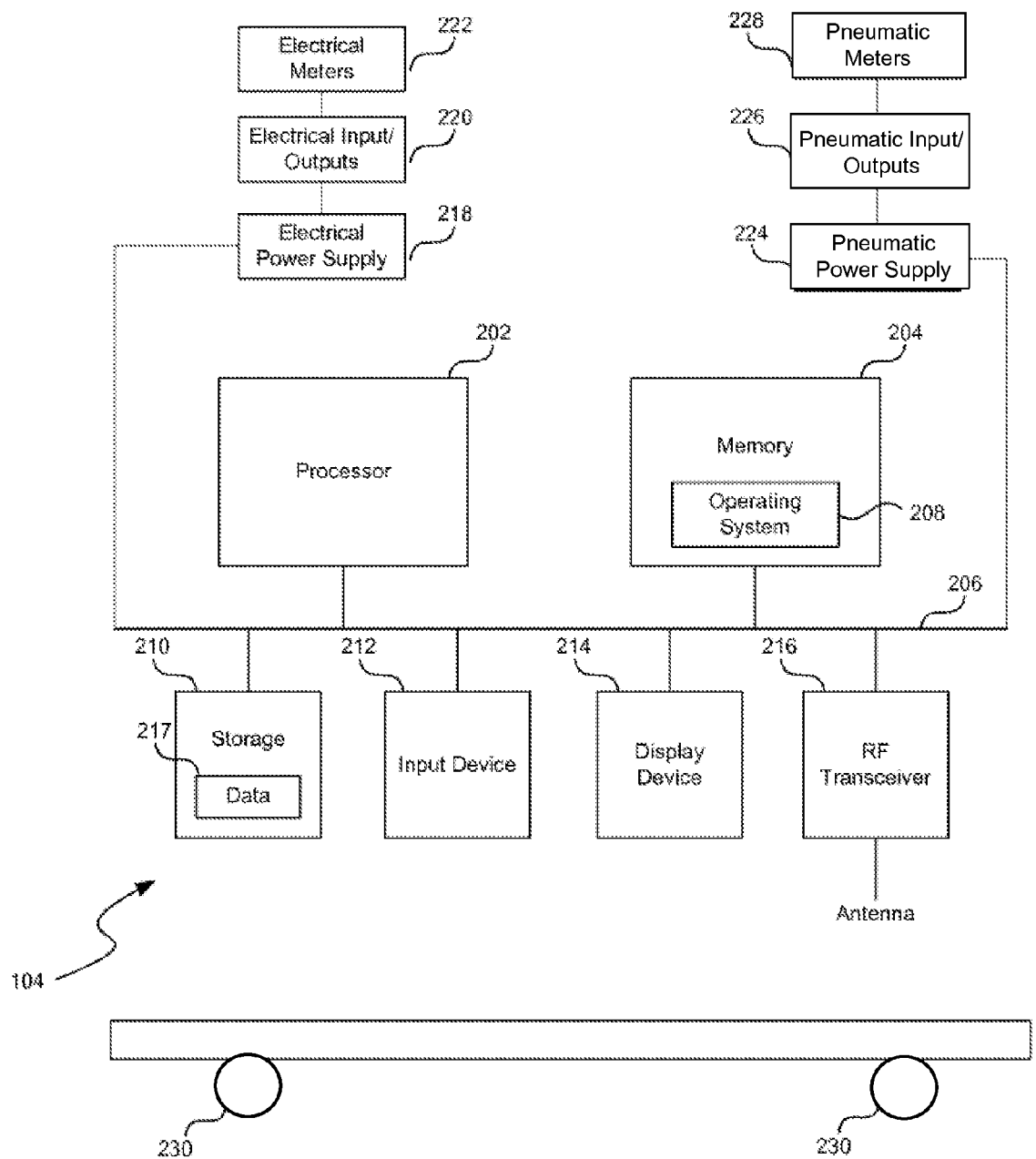
FIG. 2 is an embodiment of a portable testing unit that may be included in the system such as that shown in FIG. 1.

FIG. 2 is a high-level block diagram showing representative architecture of the PTU 102. The PTU 102 includes one or more processors 202 and memory 204 coupled to an interconnect 206. The interconnect 206 shown in FIG. 2 is an abstraction that represents any one or more separate physical buses, one or more point-to-point connections, or both buses and point-to-point connections connected by appropriate bridges, adapters, or controllers. The interconnect 206, therefore, may comprise, for example, a system bus, a Peripheral Component Interconnect (PCI) family bus, a HyperTransport or industry standard architecture (ISA) bus, a small computer system interface (SCSI) bus, a universal serial bus (USB), a IIC (I2C) bus, or an Institute of Electrical and Electronics Engineers (IEEE) standard 1394 bus, sometimes referred to as "Firewire."

The processor(s) 202 may include central processing units (CPUs) of the PTU 102 and, thus, control the overall operation of the PTU 102, including the testing of the VUT 108. In certain examples, the processor(s) 202 accomplish this by executing software or firmware stored in the memory 204. Thus, the testing algorithms used to test the VUT 108 may be stored in the memory 204. The processor(s) 202 may be, or may include, one or more programmable general purpose or special purpose microprocessors, digital signal processors (DSPs), programmable controllers, application-specific integrated circuits (ASICs), programmable logic devices (PLDs), or the like, or a combination of such devices.

The memory 204 is, or includes, the main memory of the PTU 102. The memory 204 represents any form of fixed or removable random access memory (RAM), read-only memory (ROM), flash memory, or the like, or a combination of such devices. In use, the memory 204 stores, among other things, an operating system 208 of the PTU 102.

The PTU 102 also includes an input device 212, which enables a user to operate and control the PTU 102. The input device 212 may be a keyboard, trackpad, touch sensitive screen, or other standard computer input device. The PTU 102 also has a display device 214 suitable for displaying a user interface. The display may be a liquid-crystal display (LCD), a plasma display, a vacuum fluorescent display, a light-emitting diode (LED) display, a field emission display, and/or other suitable type of display configured to present a user interface. The display device 214 may additionally incorporate analog gauges such as pressure, current, and voltage gauges. The PTU 102 further includes a radio frequency (RF) transceiver 216 that enables the PTU 102 to communicate with remote devices over a network and may be, for example, a wireless adapter. The PTU 102 may further include local storage 210 coupled to the interconnect 206. The local storage 210 may be, for example, a flash memory device that is configured to provide mass storage and that stores data 217 used by the mobile device. The data 217 may include any data that is acquired during the testing sequence and stored in local storage 210. In some embodiments, the testing algorithm instruction sets may be stored in local storage 210.

The PTU 102 also includes electrical input/output connectors 220 and an electrical power supply 218. The electrical power supply 218 is connected to the connecting assembly 106 (FIG. 1) through the electrical input/outputs connectors 220. The electrical power supply 218 supplies electrical current and voltage to the VUT 108 through the connecting assembly 106. Additionally, the electrical output connectors 220 deliver testing signals to the VUT 108 through the connecting assembly 106. The electrical input connectors 220 also receive testing data from the VUT 108 through the connecting assembly 108.

The PTU 102 also includes electrical meters 222, which may include instruments or sensors for measuring or detecting current, voltage, frequency, resistance, capacitance, conductance, decibels, duty cycle, inductance, temperature, forward drop across diode junctions, and the like. The electrical meters 222 receive electrical testing signals generated by the VUT 108 through the electrical inputs 220. The electrical meters 222 can generate computer-readable signals that encode the results of such measurements and incorporate the computer-readable signals into the test data.

The PTU 102 also includes pneumatic input/output connectors 226 and a pneumatic power supply 224. The pneumatic power supply 224 is connected to the connecting assembly 106 through the pneumatic input/output connectors 226. The pneumatic power supply 224 supplies air and pressure to the VUT 108 through the connecting assembly 106. Additionally, the pneumatic output connectors 226 deliver testing signals to the VUT 108 through the connecting assembly 106. The pneumatic input/output connectors 226 receive testing data from the VUT 108 through the connecting assembly 106.

The PTU 102 further includes pneumatic meters 228. The pneumatic meters 228 may include instruments or sensors for measuring or detecting pressure, air flow, displacement, temperature, volume, and the like. The pneumatic meters 228 receive pneumatic testing signals generated by the VUT 108 through the electrical inputs 220. The electrical meters 228 generate computer readable signals that encode the results of such measurements and incorporate the computer-readable signals into the test data. The PTU 102 additionally includes mounted wheels 230 so that the it may move easily between tractor trailers.

Figure 3:
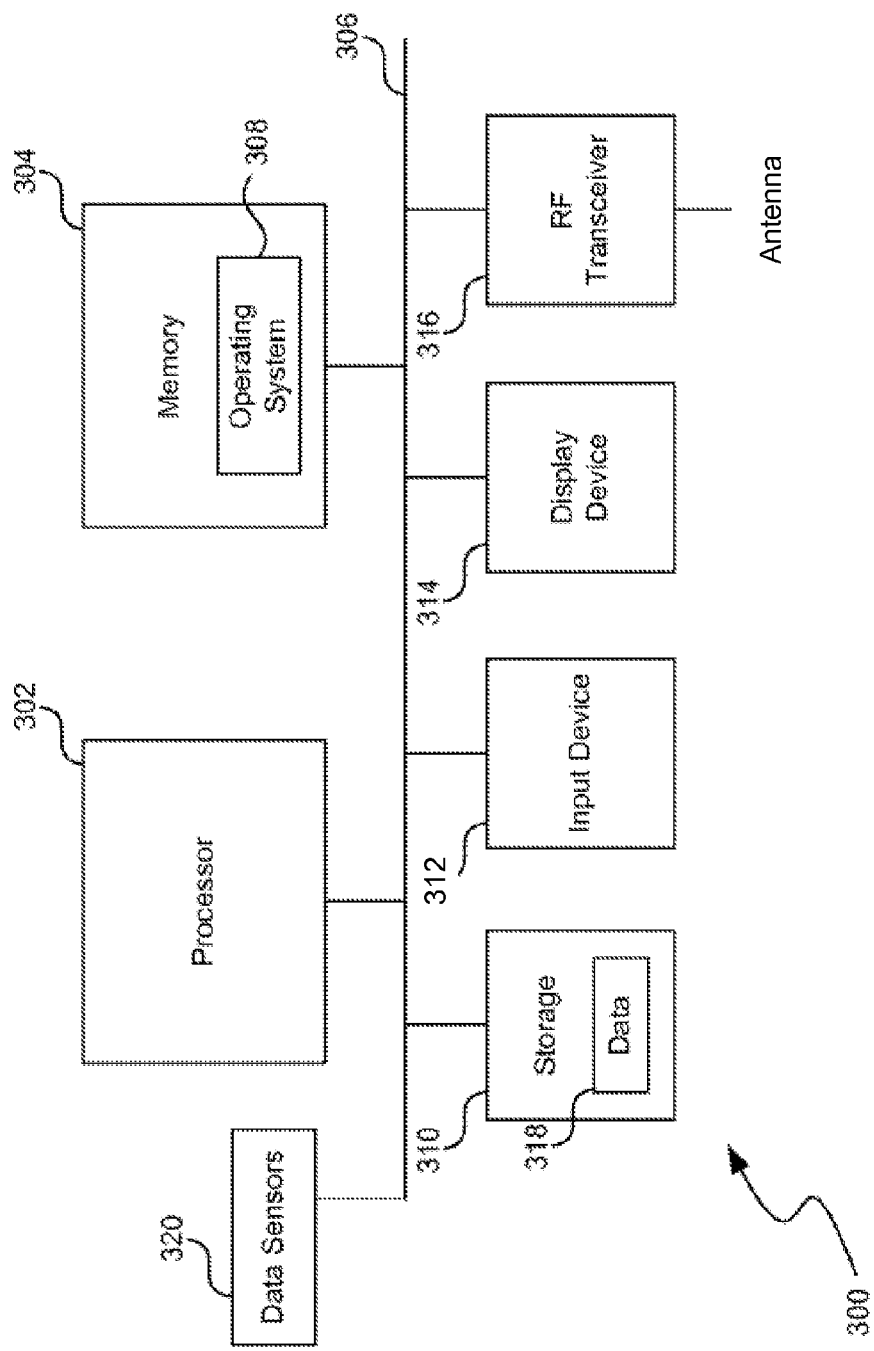
FIG. 3 is an embodiment of a handheld control unit that may be included in the system such as that shown in FIG. 1.

FIG. 3 is a high-level block diagram showing a representative implementation of the HCU 104. Not all of the functional blocks shown in FIG. 3 may be required to practice the invention. Variation in the arrangement and type of functional blocks may be made without departing from the spirit and scope of the invention. The HCU 104 can be held by a user and may resemble, both in size and shape, typical hand held units, such as universal remote controls or mobile computing devices such as smartphones or tablets. The HCU 104 is used to remotely control and operate the PTU 102, as well as to provide data and initiate testing sequences.

The HCU 104 includes a number of components similar to components included on the PTU 104. The HCU 104 includes one or more processors 302 and memory 304 coupled to an interconnect 306. The processor(s) 302 may be central processing units (CPUs) of the HCU 104 and, thus, control the overall operation of the HCU 104. In certain examples, the processor(s) 302 accomplish this by executing software or firmware stored in the memory 304.

The HCU 104 also includes a manual input device 312. The manual input device 312 enables the user to initiate and control tests of the VUT 108. The manual input device 312 may be a keyboard, trackpad, touch sensitive screen, or other standard computer input device. Some testing algorithms may prompt the user for further input or control sequences during a test, which the user may provide through the manual input device 312. Other test algorithms may be automated, such that after a user initiates the test with the manual input device 312, the PTU 102 is able to complete and acquire all the data associated with the automated testing algorithm, without further interaction from the user.

A user may also use the manual input device 312 to enter data pertaining to the VUT 108. Such data may include a Vehicle Identification Number (hereinafter "VIN"), registration number, or other identifier that uniquely identifies the VUT 108. Additionally, the user may use the manual input device 312 to enter test data during or after the completion of a testing sequence. For instance, some testing algorithms may require the user to monitor lights on the trailer to determine if they are operative during a testing sequence. During such a test, the user may use the manual input device 312 to indicate whether the VUT's 108 were operative. The data manually entered by the user is communicated to the PTU 102 and integrated with the other test data acquired during the test.

The HCU 104 also has a display device 314 suitable for displaying information and data to the user. In some embodiments, the display device 314 and the manual input device 312 may be integrated into a single display screen by employing touch sensitive display technologies. The display device 314 can provide the user with real-time information regarding the progress of an ongoing test, such as pass/fail indicators for particular subsystems or VUT sensors. Additionally, the display device 314 may display test data acquired by the PTU 102, analyzed data from the server 114, or the Final Report generated by the server.

The HCU 104 further includes an RF transceiver 316 that provides the HCU 104 with the ability to communicate with the PTU 102. In some embodiments, the HCU 104 may also communicate with the PTU 102 and other general computing devices, such as the server 114 using the network 118.

The HCU 104 may also include local storage 310 coupled to the interconnect 306. The local storage 310 may be, for example, a flash memory device that is configured to provide mass storage and that stores data 318 used by HCU 104 of PTU 102. Data entered or acquired with HCU 104 may be stored in local storage 310.

Additionally, the HCU 104 includes data entry sensors 320. Generally, the data entry sensors 320 acquire and enter data automatically. The data entry sensors 320 may include optical scanners or arrays of charge-coupled devices (hereinafter "CCDs"). With the incorporation of such sensors in the HCU 104, the user may use the HCU 104 to scan information contained in barcodes, QR codes, or other scannable technologies. The data entry sensors 320 may also include a temperature sensor, a global positioning system (hereinafter "GPS") receiver to provide location and timestamp data from the tests, and/or a microphone to enable the HCU 104 to collect audio data.

Figure 4:
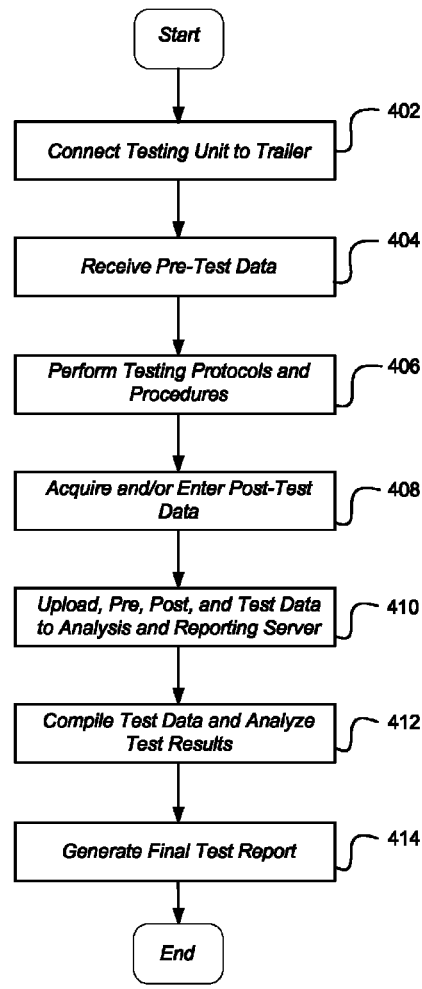
FIG. 4 illustrates a logical flow diagram generally showing one embodiment of an overview process for testing and data acquisition of a tractor trailer and the analysis and generation of a final testing report.

FIG. 4 is a flowchart of a process 400 for testing and maintaining the subsystems of a tractor-trailer with data acquisition, data management, and report generation at least partially automated. Processing begins at block 402, where a user physically connects the PTU 104 to the tractor trailer to be tested (VUT 108). As discussed herein, the connector assembly 106 provides the connection between the PTU 102 and the VUT 108. In particular, the PTU 102 can supply electrical and pneumatic power to the VUT via the connector assembly 106 without requiring an associated tractor.

Processing then proceeds to block 404, where the system receives pre-test data, such as the VUT's VIN, registration number, or other identifier. Some pre-test data may be specific to the history of the VUT 108, such as historical test data, maintenance records, fleet records and the like. Other pre-test data may relate to the current condition of the VUT 108, such as part identifying numbers of parts currently installed on the VUT 108 or replacements parts to be installed in the future. Still other pre-test data may pertain to test conditions, such as the algorithm that will be used to perform the test. Additional pre-test data may identify the user or tester, such as the user's name, employee number, or social security number. Other pre-test data may include date, timestamps, and/or coordinates of the testing location. It is to be understood that practically any data that is potentially relevant to the test analysis and/or reporting may be provided as pre-test data.

The pre-test data may be manually entered by the user through the PTU 102 or HCU 104. Alternatively, in some embodiments, the data may be entered by optically scanning a barcode or QR code or taking a photo of a license plate or other identifying component with the HCU 104. Some of the pre-test data may be manually or automatically downloaded from the server 114 or external databases.

Processing then proceeds to block 406, where the system tests the VUT's 108 electrical subsystems 110 and pneumatic subsystem 112. As discussed above, the user may initiate the test with either the PTU 102 or the HCU 104. The testing algorithm may be varied by the user. During a test, the PTU 102 controls and operates the VUT subsystems, in a manner conforming to the user-supplied test algorithms. In some embodiments, the testing algorithms may be provided by vendors supplying the VUT subsystems. The PTU 102 operates at least one of the VUT subsystems 110 and 112 and selectively delivers electrical or pneumatic power to the subsystem through at least one of the connectors in the connector assembly 106. During a test sequence, lights on the VUT 108 may be turned on and off in a predetermined sequence. Other testing operations may include actuating hydraulic brakes, initiating and monitoring any sensors found on the VUT, or operating other electronic or hydraulic components found on the VUT 108.

At block 408, data from the testing sequence is acquired. As discussed above, some of the data may be acquired automatically by the PTU 102, such as sensor readings or voltage/current readings. In some embodiments, the data is acquired in the form of electronic signals transmitted to the PTU 102 through the connectors in the connecting assembly 106. Other data may be entered by the user using the PTU 102 or HCU 104. Such user-entered test data may indicate whether each light turned on as prescribed by the testing algorithm, whether a braking mechanism engaged, and the displacement distance of the braking mechanisms. Any data describing the ongoing test, the VUT 108, or the fleet containing the VUT 108 may also be received at this block. Some of the data may be acquired with optical or photo-sensors. As discussed above, some optical or photo-sensors may be located on the HCU 104. In some embodiments, some of the data may be acquired from other devices using the network 118. Some of the acquired data may be provided in response to the operation of the subsystems 110 and 112. Some of the quantities represented in the acquired data may include current, voltage, pressure and the like. In some embodiments, the acquired data may be saved in an electronic file.

Processing then proceeds block 410, where all of the relevant testing data received during blocks 404, 406, and 408 is sent to the server 114 via the network 118. In addition, the server 114 may receive data entered manually by a user directly into at server 114 or over the network 118 from other devices or databases. In some embodiments, the server may receive at least some of the data in the form of an electronic file. In some embodiments, the server 114 may store the received electronic file or create a new electronic file to store the data.

Processing next proceeds to block 412, where received data is compiled and analyzed by the server 114. The analysis algorithm may be defined by a user or provided by another source. The analysis is based at least on the raw data generated from the testing process. In some embodiments, the server generates a processed data set that includes the raw testing data and the results of the analysis. In some embodiments, the analysis algorithm will characterize the subsystems as passing or failing based on the processed data set. The server 114 may automatically generate additional reports based on either the analysis or the test report and send the reports to other parties. Such additional reports may specify work orders and replacements parts for parts on the VUT 108 that have been found to need replacement based on the testing analysis.

Processing next proceeds to block 414, where the server 114 generates a final test report. The final test report is based on the processed data set and the characterizations of the subsystems. In some embodiments, the final report is saved in an electronic file. The server may also send the electronic report may be sent to the printer 116 to be printed. In addition, the server 114 indexes, manages, and stores the electronic report. Thus the final report may become input data for subsequent testing and analysis of the VUT 108 or other tractor trailers in the fleet. In some embodiments, the server 114 also indexes, manages, and stores the acquired pre-testing data, raw testing data, post-testing data, and processed data. All this data may be accessed and used for future testing cycles.

FIG. 5 is a non-limiting example of a redacted final analysis report. The report shown is meant to be illustrative of both possible content and formatting. However, an actual final report generated by the system may vary significantly in both content and formatting. As shown in FIG. 5, a typical final report may contain information identifying the VIN of the vehicle that has been tested, as well as the test site, test operator, and other such identifying information. The analyzed test data and test results may also be contained in the final test report.

In the final report, the results may be organized into sections, such as electrical, air, differential pressure, and the like. Under each section, the results may be displayed for the various subsystems pertaining to the section. For instance, the electrical section may contain results for the electronics pertaining to brakes, auxiliary systems, and the various lights on the vehicle under test. Each entry in the electrical section may contain the values for various measurements, such as current and voltage. Additional information such as condition, test mode, and status (Pass or Fail) of the result may also be included. Similar information for the air and differential pressure sections may also be included.

From the foregoing, it will be appreciated that specific embodiments of the invention have been described herein for purposes of illustration, but that various modifications may be made without deviating from the invention. Accordingly, the invention is not limited to the specific embodiments described herein.

I claim:

1. A method for data acquisition, data management, and report generation for testing systems of a vehicle, the method comprising:

coupling a portable testing unit to a plurality of subsystems of the vehicle via a connector, wherein the plurality of subsystems includes at least an electrical subsystem and a pneumatic subsystem and wherein the portable testing unit includes an electrical power supply and a pneumatic power supply;

operating a selected subsystem of the plurality of subsystems by selectively delivering electrical and pneumatic power from at least one of the electrical power supply or the pneumatic power supply to the selected subsystem through the connector, wherein the selected subsystem includes at least one of an electrical light component or a pneumatic brake mechanism;

capturing raw test data in a first electronic file, wherein the raw test data is generated in response to the operation of the selected subsystem and encodes information relating to the operational performance of the selected subsystem and wherein the raw data test data includes at least one of voltage, amperage, or air pressure;

analyzing a data stream with a processor device, wherein the data stream includes the raw test data and historical test data of the vehicle or a plurality of vehicles of which the vehicle is a member;

generating a processed data set based on the analysis of the data stream;

generating a final test report with the processor device based on at least the processed data set; and storing the final test report in a second electronic file.

2. The method of claim 1, wherein the portable testing unit includes a first RF transceiver and is operated by a hand-held operating device which includes a second RF transceiver, wherein the portable testing unit and the hand-held operating device are configured to communicate by employing the respective RF transceivers.

3. The method of claim 1, wherein the data stream includes auxiliary information acquired at least in part via a user manually providing information to the portable testing unit or a hand-held operating device.

4. The method of claim 1, wherein the raw test data is determined based on a plurality of data signals received at the portable testing unit through the connector.

5. The method of claim 1 further comprising: transmitting the data stream to an analysis server, wherein the analysis server analyzes the data stream and generates the final test report.

6. The method of claim 1 wherein the final test report is based at least in part on the historical information.

7. The method of claim 1, further comprising automatically generating a report specifying a work order or acquisition of a replacement part based at least in part on the processed data set.

8. A non-transitory computer-readable storage medium for storing computer-executable instructions for configuring a computing system to acquire data and generate reports for automatically testing systems of a vehicle, by a method comprising:

coupling a portable testing unit to a plurality of subsystems of the vehicle via a connector, wherein the plurality of subsystems includes at least an electrical subsystem and a pneumatic subsystem and wherein the portable testing unit includes an electrical power supply and a pneumatic power supply;

operating a selected subsystem of the plurality of subsystems by selectively delivering electrical and pneumatic power from at least one of the electrical power supply or the pneumatic power supply to the selected subsystem through the connector, wherein the selected subsystem includes at least one of an electrical light component or a pneumatic brake mechanism;

capturing raw test data in a first electronic file, wherein the raw test data is generated in response to the operation of the selected subsystem and encodes information relating to the operational performance of the selected subsystem and wherein the raw data test data includes at least one of voltage, amperage, or air pressure;

analyzing a data stream with a processor device, wherein the data stream includes the raw test data and historical test data of the vehicle or a plurality of vehicles of which the vehicle is a member;

generating a processed data set based on the analysis of the data stream;

generating a final test report with the processor device based on at least the processed data set; and storing the final test report in a second electronic file.

9. The computer-readable storage medium of claim 8, wherein the portable testing unit includes a first RF transceiver and is operated by a hand-held operating device which includes a second RF transceiver, wherein the portable testing unit and the hand-held operating device are configured to communicate by employing the respective RF transceivers.

10. The computer-readable storage medium of claim 8, wherein the data stream includes auxiliary information acquired at least in part via a user manually providing information to the portable testing unit or a hand-held operating device.

11. The computer-readable storage medium of claim 8, wherein the raw test data is determined based on a plurality of data signals received at the portable testing unit through the connector.

12. The computer-readable storage medium of claim 8 further comprising:

transmitting the data stream to an analysis server, wherein the analysis server analyzes the data stream and generates the final test report.

13. The computer-readable storage medium of claim 8 wherein the final test report is based at least in part on of the historical information.

14. The computer-readable storage medium of claim 8, further comprising automatically generating a report specifying a work order or acquisition of a replacement part based on the processed data set.

15. A portable testing unit for testing systems of a vehicle, the portable testing unit comprising:

an electrical testing subsystem;

a pneumatic testing subsystem;

a connector configured to couple the electrical testing subsystem and the pneumatic testing subsystem to a plurality of subsystems of the vehicle;

wherein the portable testing unit is configured to:

operate a selected subsystem of the plurality of subsystems by selectively delivering electrical or pneumatic power from at least one of an electrical power supply or a pneumatic power supply to the selected subsystem through the connector, wherein the selected subsystem includes at least one of an electrical light component or a pneumatic brake, mechanism; and capture raw test data in a first electronic file, wherein the raw test data is generated in response to the operation of the selected subsystem and encodes information relating to the operational performance of the selected subsystem and wherein the raw test data includes at least one of voltage, amperage, or air pressure; and a processor configured to:

analyze a data stream, wherein the data stream comprises the raw test data and historical test data;

generate a processed data set based on the analysis of the data stream;

generate a final test report based on at least the processed data set and a characterization of the subsystem; and store the final test report in a second electronic file.

16. The system of claim 15, wherein the portable testing unit includes a first RF transceiver and is operated by a hand-held operating device which includes a second RF transceiver, wherein the portable testing unit and the hand-held operating device are configured to communicate by employing the respective RF transceivers.

17. The system of claim 15, wherein the data stream includes auxiliary information acquired at least in part via a user manually providing information to the portable testing unit or a hand-held operating device.

18. The system of claim 15, wherein the raw test data is determined based on a plurality of data signals received at the portable testing unit through the connector.

19. The system of claim 15, wherein the processor is further configured to transmit the data stream to an analysis server, wherein the analysis server analyzes the data stream and generates the final test report.

20. The system of claim 15, wherein the processor is further configured to automatically generate a report specifying a work order or acquisition of a replacement part based on the processed data set.

* * * * *